US012046205B2

(12) United States Patent
Shin et al.

(10) Patent No.: US 12,046,205 B2
(45) Date of Patent: Jul. 23, 2024

(54) SOURCE DRIVER AND DISPLAY DEVICE INCLUDING THE SAME

(71) Applicant: Silicon Works Co., Ltd., Daejeon (KR)

(72) Inventors: Kyung Min Shin, Daejeon (KR); Sung Ha Kim, Daejeon (KR); Yong Sung Ahn, Daejeon (KR); Jeong Lee, Daejeon (KR); Jung Ryeol Park, Daejeon (KR)

(73) Assignee: SILICON WORKS CO., LTD., Daejeon (KR)

( * ) Notice: Subject to any disclaimer, the term of this patent is extended or adjusted under 35 U.S.C. 154(b) by 36 days.

(21) Appl. No.: 17/125,553

(22) Filed: Dec. 17, 2020

(65) Prior Publication Data

US 2021/0193057 A1 Jun. 24, 2021

(30) Foreign Application Priority Data

Dec. 18, 2019 (KR) ........................ 10-2019-0169573

(51) Int. Cl.
*G09G 5/10* (2006.01)
*G09G 3/3233* (2016.01)
*G09G 3/3291* (2016.01)

(52) U.S. Cl.
CPC ....... *G09G 3/3291* (2013.01); *G09G 2320/04* (2013.01)

(58) Field of Classification Search
CPC .... G09G 3/3291; G09G 2320/04; G09G 5/00; G09G 5/08; G09G 5/10; G09G 5/18;
(Continued)

(56) References Cited

U.S. PATENT DOCUMENTS

2002/0060675 A1* 5/2002 Hashimoto ............. G06T 11/60 345/204
2014/0146071 A1* 5/2014 Kim ..................... G09G 3/3225 345/589

(Continued)

FOREIGN PATENT DOCUMENTS

KR 10-2014-0070792 A 6/2014
KR 2014-0091095 B1 7/2014

(Continued)

OTHER PUBLICATIONS

Korean Office Action dated Nov. 29, 2023 issued in Patent Application No. 10-2019-0169573 w/English Translation (17 pages).

*Primary Examiner* — Chanh D Nguyen
*Assistant Examiner* — Nguyen H Truong
(74) *Attorney, Agent, or Firm* — POLSINELLI PC

(57) ABSTRACT

Disclosed are a source driver for sensing the degree of deterioration in pixels in some regions of a display panel and compensating for the deterioration in the display panel based on the sensed degree, by considering a characteristic in which pixels included in each display panel similarly deteriorate, and a display device including the same. The display device may include a display panel including pixels, a sensing circuit configured to provide sensing data by sensing the degree of deterioration in pixels in at least one first region of the display panel, and a compensation circuit configured to calculate an amount of compensation of each of the pixels in the first region using the sensing data and compensate for the deterioration in the pixels in the first region and pixels in a second region whose degree of deterioration is not sensed, based on the amount of compensation.

16 Claims, 3 Drawing Sheets

(58) Field of Classification Search
CPC ............ G09G 5/30; G09G 3/00; G09G 3/038; G09G 3/20; G09G 3/32; G09G 3/36; G09G 3/3233; G09G 3/3241; G09G 3/3283; G09G 3/3225; G09G 3/3258; G09G 3/3275; G09G 3/3208; G09G 3/3266; G06T 5/00; G06T 5/40; H04N 19/86; H04N 19/119; H04N 19/124; H04N 19/136; H04N 19/176; H04N 19/593; H04N 19/895
See application file for complete search history.

(56) References Cited

U.S. PATENT DOCUMENTS

| | | | | |
|---|---|---|---|---|
| 2016/0148561 | A1* | 5/2016 | Park | G09G 3/3225 345/76 |
| 2017/0084227 | A1* | 3/2017 | Bae | G09G 3/3225 |
| 2018/0061029 | A1* | 3/2018 | Suzuki | G06T 5/94 |
| 2022/0130332 | A1* | 4/2022 | Ok | G09G 3/3233 |
| 2022/0375375 | A1* | 11/2022 | Lee | G09G 3/2092 |

FOREIGN PATENT DOCUMENTS

| | | | |
|---|---|---|---|
| KR | 2015-0077171 | B1 | 7/2015 |
| KR | 10-2017-0034977 | A | 3/2017 |
| KR | 2019-0077846 | A | 7/2019 |
| KR | 2019-0119925 | A | 10/2019 |
| KR | 2020-0081085 | A | 7/2020 |

* cited by examiner

SOURCE DRIVER AND DISPLAY DEVICE INCLUDING THE SAME

BACKGROUND

1. Technical Field

The present disclosure relates to a display device, and more particularly, to a source driver for sensing the degree of deterioration in some of the pixels of a display panel and compensating for the deterioration in the display panel based on the sensed degree and the display device including the same.

2. Related Art

In general, a display device includes a display panel, a source driver, a timing controller, etc.

The source driver converts, into a data voltage, digital video data provided by the timing controller, and provides the data voltage to the display panel. The source driver may be integrated in a chip form, and a plurality of source drivers may be configured by considering the size and resolution of a display panel.

Furthermore, in order to compensate for the deterioration in the display panel, the source driver senses the signal of each of pixels, converts the signal into digital data, and provides the digital data to the timing controller.

A display device according to a conventional technology senses the degree of deterioration in the pixels of all channels in order to sense the degree of deterioration in a display panel. However, the conventional technology has a problem in that the chip area of the source driver is increased because a sensing circuit for each of all the channels must be included in order to sense the degree of deterioration in the pixels of the channels.

Furthermore, in some cases, the conventional technology measures the time for which the display panel has been used, and compensates for the deterioration in the display panel based on the measured time. In this case, there is a problem in that the deterioration in pixels of the display panel is not accurately compensated for because the deterioration in the pixels is compensated for using only the measured time without sensing the deterioration in the pixels.

SUMMARY

Various embodiments are directed to providing a source driver for sensing the degree of deterioration in some of the pixels of a display panel and compensating for the deterioration in the display panel based on the sensed degree, and a display device including the same.

In an embodiment, a display device may include a display panel including pixels, a sensing circuit configured to provide sensing data by sensing the degree of deterioration in pixels in at least one first region of the display panel, and a compensation circuit configured to calculate the amount of compensation of each of the pixels in the first region using the sensing data and compensate for the deterioration in the pixels in the first region and pixels in a second region whose degree of deterioration is not sensed, based on the amount of compensation. The compensation circuit may compensate for the deterioration in the pixels in the first region and the second region using at least one of a minimum value, average value, and maximum value of the amount of compensation based on a difference between the minimum value and the maximum value.

In an embodiment, a display device may include a display panel including pixels, a source driver configured to provide the display panel with a data voltage based on image data and provide sensing data by sensing the degree of deterioration in pixels in at least one first region of the display panel, and a controller configured to calculate the amount of compensation of each of the pixels in the first region using the sensing data, generate compensation data for compensating for the deterioration in the pixels in the first region and pixels in a second region whose degree of deterioration is not sensed, based on the amount of compensation, and correct the image data using the compensation data. The controller may compensate for the deterioration in the pixels in the first region and the second region using at least one of a minimum value, average value, and maximum value of the amount of compensation based on a difference between the minimum value and the maximum value.

In an embodiment, a source driver may include a data driver configured to provide a display panel with a data voltage based on image data, a sensing circuit configured to provide sensing data by sensing the degree of deterioration in pixels in at least one first region of the display panel, and a compensation circuit configured to calculate the amount of compensation of each of the pixels in the first region using the sensing data, generate compensation data for compensating for the deterioration in the pixels in the first region and pixels in a second region whose degree of deterioration is not sensed, based on the amount of compensation, and correct the image data using the compensation data. The compensation circuit may compensate for the deterioration in the pixels in the first region and the second region using at least one of a minimum value, average value, and maximum value of the amount of compensation based on a difference between the minimum value and the maximum value.

DETAILED DESCRIPTION

Figure 1:
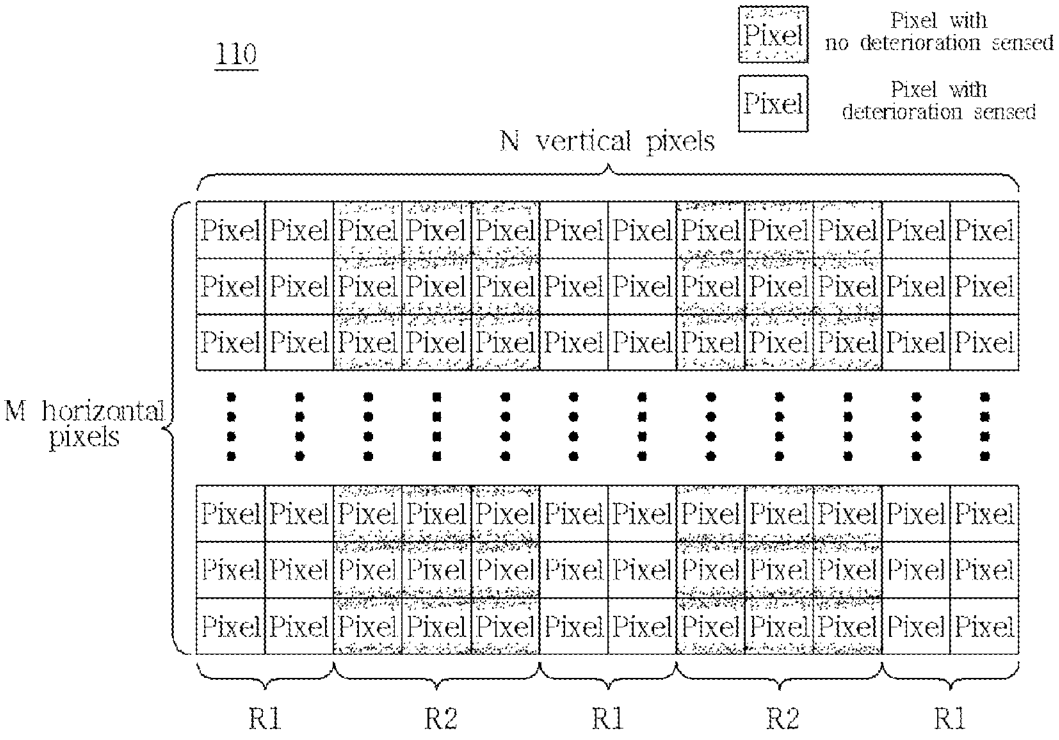
FIG. 1 is a diagram for schematically describing a method of compensating for the deterioration in a display device according to an embodiment.

Exemplary embodiments will be described below in more detail with reference to the accompanying drawings. The disclosure may, however, be embodied in different forms and should not be constructed as limited to the embodiments set forth herein. Rather, these embodiments are provided so that this disclosure will be thorough and complete, and will fully convey the scope of the disclosure to those skilled in the art. Throughout the disclosure, like reference numerals refer to like parts throughout the various figures and embodiments of the disclosure.

Embodiments disclose a source driver for sensing the degree of deterioration in pixels in some regions of a display panel and compensating for the deterioration in the display panel based on the sensed degree, by considering a characteristic in which pixels included in each display panel similarly deteriorate, and a display device including the same.

In embodiments, a first region may be defined as a region where the degree of deterioration is sensed. A second region may be defined as a region where the degree of deterioration is not sensed. In this case, the first region may be divided into a plurality of regions.

In embodiments, accumulated data is accumulated data of image data, and may be defined as accumulated data of image data from a previous frame to a current frame. In this case, if the amount of the accumulated data is great, this may mean that the organic light-emitting diode (OLED) of each of pixels has much emitted light and the OLED has much deteriorated.

Embodiments may use accumulated data as a criterion for selecting the first region where the degree of deterioration will be sensed, among the regions of a display panel.

FIG. 1 is a diagram for schematically describing a method of compensating for the deterioration in a display device according to an embodiment.

Referring to FIG. 1, an embodiment discloses the display device for sensing the degree of deterioration in pixels in at least one first region R1 of a display panel 110 and compensating for the deterioration in the pixels in the first region R1 and pixels in a second region R2 where the degree of deterioration is not sensed, based on the degree of deterioration in the pixels in the first region R1.

According to an embodiment, a sensing circuit for each of all channels does not need to be included because the degree of deterioration in the pixels in the first region R1 of the display panel 110 is sensed. Accordingly, the chip area of a source driver can be reduced. For example, the display panel 110 may include N vertical pixels and M horizontal pixels. According to an embodiment, if the first region R1 is divided into three regions and the degree of deterioration in the pixels in the three regions is sensed, the chip area of a source driver can be reduced because sensing circuits are necessary for only three channels coupled to the three regions.

Figure 2:
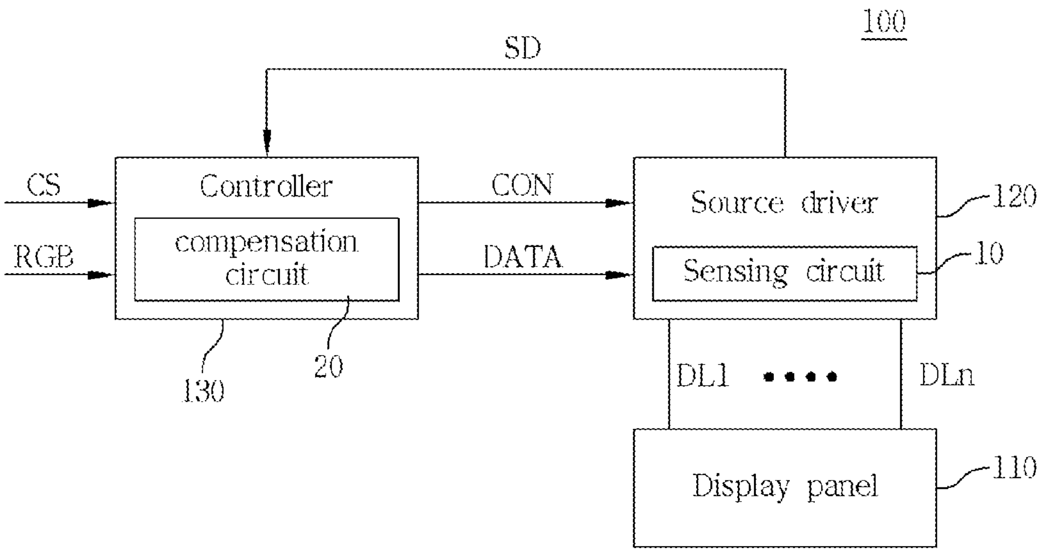
FIG. 2 is a block diagram of a display device according to an embodiment.

FIG. 2 is a block diagram of a display device 100 according to an embodiment.

Referring to FIG. 2, the display device 100 may include the display panel 110, a source driver 120, and a controller 130.

The display panel 110 may be a region where an image is displayed. The display panel 110 may include gate lines (not illustrated), data lines DL1 to DLn intersecting the gate lines, and pixels defined by the gate lines and the data lines DL1 to DLn.

Each of the pixels may include a driving transistor and an OLED. Each of the pixels may emit light having brightness corresponding to a data voltage provided by each of the data lines in response to a scan signal provided by each of the gate lines. Furthermore, the degree of deterioration in the driving transistor and OLED of each of the pixels may be sensed by a transistor turned on through a sensing control line (not illustrated).

The display panel 110 may be divided into the first region R1 where the degree of deterioration is sensed and the second region R2 where the degree of deterioration is not sensed. Furthermore, the first region R1 may be divided into a plurality of regions. For example, the first region R1 may be selected based on accumulated data of image data accumulated in a frame unit.

The source driver 120 provides the display panel 110 with a data voltage based on image data DATA, and provides sensing data SD to the controller 130 by sensing the degree of deterioration in the pixels in the at least one first region R1 of the display panel 110.

The source driver 120 may be coupled to the data lines of the display panel 110. The source driver 120 may change the image data DATA into the data voltage in response to a driving control signal CON. The source driver 120 may provide the data voltage to the display panel 110 through the data lines DL1 to DLn.

The source driver 120 may include a sensing circuit 10 for sensing the degree of deterioration in the pixels in the first region R1. The sensing circuit 10 may provide the controller 130 with the sensing data SD corresponding to the degree of deterioration in each of the pixels in the first region R1.

The sensing circuit 10 may include sample and hold circuits (not illustrated) coupled to the data lines DL1 to DLn, and may sample the amount of current, flowing into the OLED of each of the pixels, through each of the data lines DL1 to DLn. The sensing circuit 10 may convert the amount of current, flowing into the OLED of each of the pixels, into the sensing data SD, that is, a digital value.

The controller 130 may calculate the amount of compensation of each of the pixels in the first region R1 using the sensing data SD, and may generate compensation data for compensating for the deterioration in the pixels in the first region R1 and the pixels in the second region R2 where the degree of deterioration is not sensed, based on the calculated amount of compensation.

Furthermore, the controller 130 may correct the image data DATA using the compensation data, and may provide the corrected data to the source driver 120.

The controller 130 may receive a control signal CS and an image signal RGB from a host system. In this case, the image signal RGB may include brightness and color information of pixels. The control signal CS may include a vertical sync signal, a horizontal sync signal, an enable signal, and a clock signal.

The controller 130 may generate the driving control signal CON and the image data DATA in response to the image signal RGB and the control signal CS. The controller 130 may classify the image signal RGB in a frame unit in response to the vertical sync signal, may classify the image signal RGB in a scan line unit in response to the horizontal sync signal, and may generate the image data DATA based on the results of the classification.

The controller 130 may generate compensation data for correcting the image data DATA using the sensing data SD, and may provide the corrected image data DATA to the source driver 120.

The controller 130 may include a compensation circuit 20. The compensation circuit 20 may calculate the amount of compensation corresponding to the degree of deterioration in each of pixels using the sensing data SD, may generate compensation data using the amount of compensation, and may correct the image data DATA using the compensation data.

When a difference between a minimum value and maximum value of the amount of compensation of the pixels in the first region R1 is less than a reference value, the compensation circuit 20 may compensate for the deterioration in the pixels in the first region R1 and the second region R2 using at least one of the minimum value, the average value, and a maximum value of the amount of compensation in the pixels in the first region R1.

When the difference between the minimum value and the maximum value of the amounts of compensation of the pixels in the first region R1 is equal to or more than the reference value, the compensation circuit 20 may compensate for the deterioration in the pixels in the first region R1 based on the amount of compensation in which gradient weight has been applied to surrounding pixels based on a pixel having the maximum value of the amount of compensation, and may compensate for the deterioration in the pixels in the second region R2 using at least one of the minimum value, average value, and maximum value of the amounts of compensation of the pixels in the first region R1.

The compensation circuit 20 may accumulate image data in a frame unit, and may select the first region R1 based on the accumulated data. The compensation circuit 20 may control to periodically sense the degree of deterioration in the pixels in the selected first region R1.

The compensation circuit 20 may include a region selection module for accumulating the image data DATA and selecting the first region R1 based on the accumulated data, a compensation amount calculation module for calculating the amount of compensation of each of the pixels in the first region using the sensing data of the first region R1, and a compensation module for generating compensation data based on the amount of compensation and correcting the image data using the compensation data.

The compensation circuit 20 may control the image data DATA, from a previous frame to a current frame for each pixel, to be accumulated, the first region R1 to be selected based on the accumulated data, and the degree of deterioration in the pixels in the first region R1 to be sensed. In this case, if the amount of accumulated data is great, this may mean that the OLED of each of the pixels has much emitted light and that the OLED or the driving transistor of each pixel has much deteriorated. Accumulated data accumulated in the pixels may be different for each pixel.

The compensation circuit 20 may select the first region R1 by analyzing the accumulated data of each of the pixels.

Furthermore, the compensation circuit 20 can prevent the occurrence of a brightness deviation by sensing the degree of deterioration in surrounding pixels based on a pixel that has much deteriorated and correcting the image data DATA.

Figure 3:
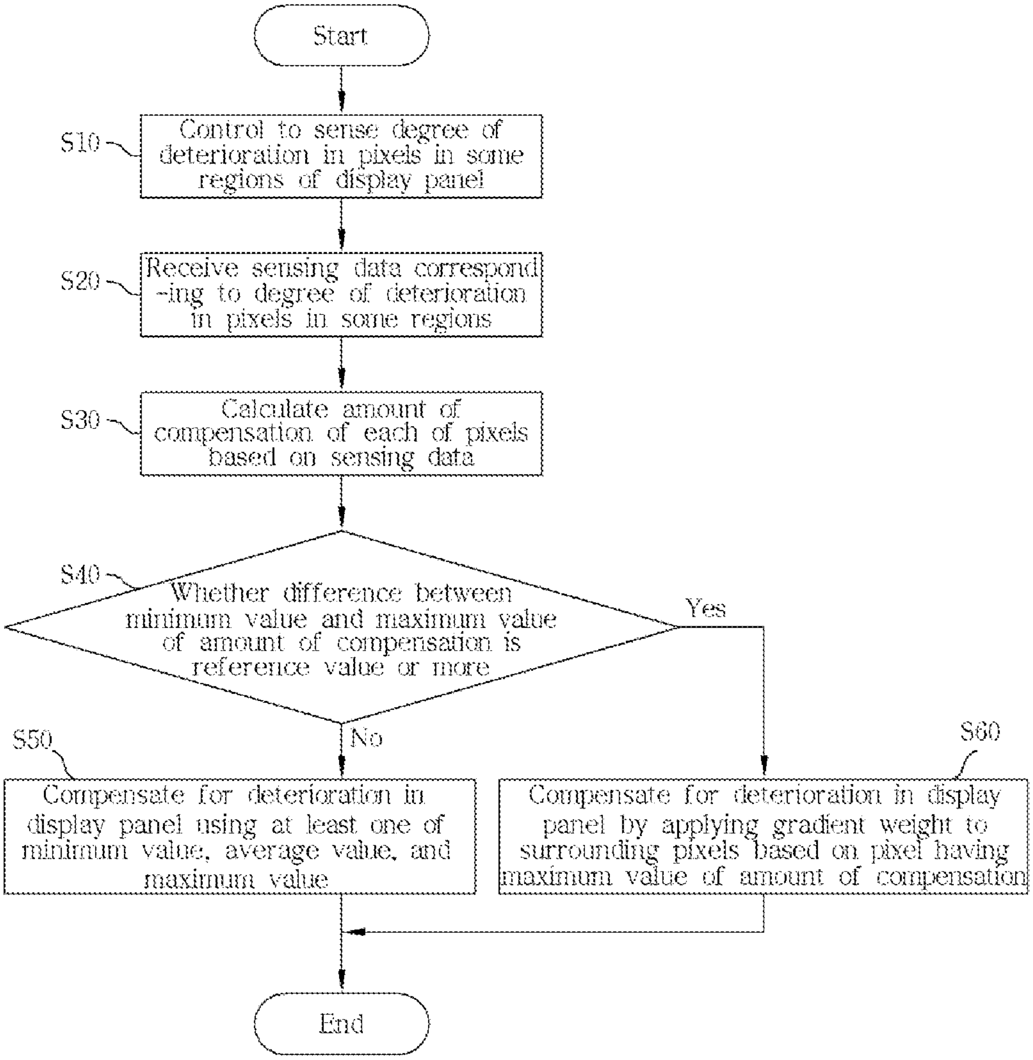
FIG. 3 is a flowchart for describing an operation of a display device for compensating for the deterioration according to an embodiment.

FIG. 3 is a flowchart for describing an operation of the display device 100 for compensating for the deterioration according to an embodiment.

Referring to FIG. 3, the controller 130 may control the source driver 120 to sense the degree of deterioration in the pixels in the first region R1 of the display panel 110 (S10). For example, the controller 130 may select, as the first region R1, a region where the degree of deterioration is expected to be greater than those of other regions based on accumulated data of image data from a previous frame to a current frame.

Next, the controller 130 may receive the sensing data SD, corresponding to the degree of deterioration in the pixels in the first region R1, from the source driver 120 (S20). For example, the source driver 120 may sense the degree of deterioration in the pixels in the first region R1 through the data lines coupled to the first region R1 in response to the driving control signal CON from the controller 130, may convert the sensed degree into the sensing data SD, that is, a digital value, and may provide the sensing data SD to the controller 130.

Next, the controller 130 may calculate the amount of compensation of each of the pixels in the first region R1 based on the sensing data SD (S30). For example, the controller 130 may calculate the amount of compensation using a look-up table composed of the sensing data SD versus the amount of compensation, or may calculate the amount of compensation using a relation equation using the sensing data SD as a variable.

Next, the controller 130 may compare a difference between a minimum value and maximum value of the amount of compensation with a reference value in order to check whether the difference is the reference value or more (S40).

Such a comparison may be used to distinguish between a case where the pixels of the display panel 110 similarly deteriorate and a case where the pixels of the display panel 110 differently deteriorate. For example, if the pixels of the display panel 110 similarly deteriorate, the controller 130 may sense the degree of deterioration in pixels in some regions of the display panel and compensate for the deterioration in the display panel based on the sensed degree. For another example, if the pixels of the display panel 110 differently deteriorate, the controller 130 may compensate for the deterioration in the display panel by applying gradient weight to surrounding pixels based on a pixel estimated to have much deteriorated.

When the difference between the minimum value and the maximum value of the amount of compensation is less than the reference value, the controller 130 may compensate for the deterioration in the pixels in the first region R1 and the second region R2 using at least one of the minimum value, average value, and maximum value of the amounts of compensation of the pixels in the first region R1 (S50).

In contrast, when the difference between the minimum value and the maximum value of the amount of compensation is the reference value or more, the controller 130 may compensate for the deterioration in the pixels in the first region R1 based on the amount of compensation in which gradient weight has been applied to surrounding pixels based on a pixel having the maximum value of the amount of compensation, and may compensate for the deterioration in the pixels in the second region R2 using at least one of the minimum value, average value, and maximum value of the amounts of compensation of the pixels in the first region R1 (S60).

Figure 4:
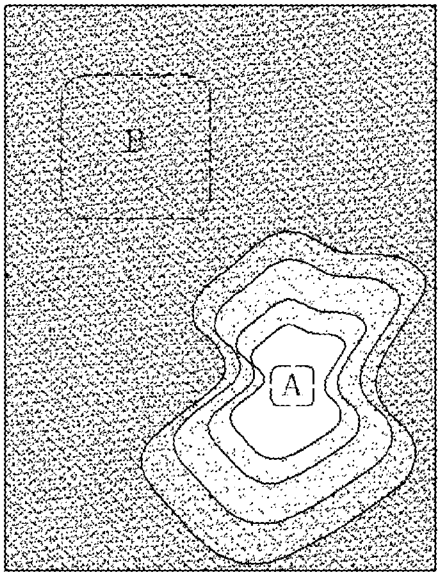
FIG. 4 is a diagram illustrating that a region where the degree of deterioration will be preferentially sensed is selected in a display panel.

FIG. 4 is a diagram illustrating that a region where the degree of deterioration will be preferentially sensed is selected in a display panel.

For example, according to an embodiment, image data to be provided to the source driver may be accumulated in a frame unit. A region where the degree of deterioration is expected to be greater than those of other regions may be selected based on accumulated data from a previous frame to a current frame.

Furthermore, according to an embodiment, brightness and color having high frequency of use may be analyzed based on accumulated data. The degree of deterioration in pixels in a region where deterioration may much occur may be periodically sensed.

Furthermore, according to an embodiment, as illustrated in FIG. 4, when a difference in a degree of deterioration between a region A and a region B is a reference value or more, the deterioration in surrounding pixels may be compensated for based on the amount of compensation in which gradient weight has been applied to the surrounding pixels based on the region A having a maximum value of the amount of compensation. In such an embodiment, if pixels differently deteriorate, the deterioration in a display panel may be compensated for by applying gradient weight to surrounding pixels based on a pixel estimated to have much deteriorated.

As described above, embodiments can reduce the chip area of a source driver because sensing circuits are necessary for only channels coupled to a region where the degree of deterioration in pixels will be sensed in a display panel.

Embodiments can reduce a sensing time because the degree of deterioration in pixels in some regions of a display panel is sensed, and can improve the accuracy of compensation of deterioration compared to a conventional technology for compensating for deterioration based on only a use time.

While various embodiments have been described above, it will be understood to those skilled in the art that the embodiments described are by way of example only. Accordingly, the disclosure described herein should not be limited based on the described embodiments.

What is claimed is:

1. A display device comprising:

a display panel comprising pixels and divided into at least one first region where deterioration is sensed and at least one second region where deterioration is not sensed, wherein the at least one first region is determined to have a degree of deterioration greater than the at least one second region based on accumulated image data from a previous frame to a current frame, and wherein each of the at least one first region and the at least one second region includes at least one entire column of the pixels disposed along a vertical direction in the display panel;

a sensing circuit configured to provide sensing data by sensing the degree of deterioration in pixels in the at least one first region of the display panel, and not sensing the degree of deterioration in pixels in the at least one second region of the display panel; and a compensation circuit configured to calculate an amount of compensation of each of the pixels in the first region using the sensing data and compensate for the deterioration in the pixels in the first region and the second region, based on the amount of compensation, wherein the compensation circuit compensates for the deterioration in the pixels in the first region and the second region using at least one of a minimum value, average value, and maximum value of the amount of compensation based on a difference between the minimum value and the maximum value.

2. The display device of claim 1, wherein when the difference is less than a reference value, the compensation circuit compensates for the deterioration in the pixels in the first region and the second region using at least one of the minimum value, average value, and maximum value of the amount of compensation.

3. The display device of claim 1, wherein when the difference is equal to or more than the reference value, the compensation circuit compensates for the deterioration in the pixels in the first region based on an amount of compensation in which gradient weight has been applied to surrounding pixels based on a pixel having the maximum value of the amount of compensation.

4. The display device of claim 3, wherein the compensation circuit compensates for the deterioration in the pixels in the second region using at least one of the minimum value, average value, and maximum value of the amount of compensation.

5. The display device of claim 1, wherein the compensation circuit accumulates image data in a frame unit and selects the first region based on the accumulated data.

6. The display device of claim 5, wherein the compensation circuit controls to periodically sense the degree of deterioration in the pixels in the selected first region.

7. A mobile phone comprising:

a display panel comprising pixels and divided into at least one first region where deterioration is sensed and at least one second region where deterioration is not sensed, wherein the at least one first region is determined to have a degree of deterioration greater than the at least one second region based on accumulated image data from a previous frame to a current frame, and wherein the at least one first region and the at least one second region arc randomly is located in the display panel, and non fixing images arc displayed in the at least one first region and the at least one second region each of the at least one first region and the at least one second region includes at least one entire column of pixels disposed along a vertical direction in the display panel;

a source driver configured to provide the display panel with a data voltage based on image data and provide sensing data by sensing the degree of deterioration in pixels in the at least one first region of the display panel and not sensing the degree of deterioration in pixels in the at least one second region of the display panel; and a controller configured to calculate an amount of compensation of each of the pixels in the first region using the sensing data, generate compensation data for compensating for the deterioration in the pixels in the first region and the second region, based on the amount of compensation, and correct the image data using the compensation data, wherein the controller compensates for the deterioration in the pixels in the first region and the second region using at least one of a minimum value, average value, and maximum value of the amount of compensation based on a difference between the minimum value and the maximum value.

8. The display device of claim 7, wherein the source driver comprises a sensing circuit configured to provide the sensing data by sensing the degree of deterioration in the pixels in the first region.

9. The display device of claim 7, wherein when the difference is less than a reference value, the controller generates the compensation data for compensating for the deterioration in the pixels in the first region and the second region using at least one of the minimum value, average value, and maximum value of the amount of compensation.

10. The display device of claim 7, wherein when the difference is equal to or more than the reference value, the controller generates the compensation data for compensating for the deterioration in the pixels in the first region based on an amount of compensation in which gradient weight has been applied to surrounding pixels based on a pixel having the maximum value of the amount of compensation.

11. The display device of claim 10, wherein the controller generates the compensation data for compensating for the deterioration in the pixels in the second region using at least one of the minimum value, average value, and maximum value of the amount of compensation.

12. The display device of claim 7, wherein the controller accumulates image data in a frame unit and selects the first region based on the accumulated data.

13. The display device of claim 7, wherein the controller comprises a compensation circuit configured to generate the compensation data using the sensing data and correct the image data using the compensation data.

14. A source driver comprising:

a data driver configured to provide a display panel, which comprises pixels and is divided into at least one first region where deterioration is sensed and at least one second region where deterioration is not sensed, wherein the at least one first region is determined to have a degree of deterioration greater than the at least one second region based on accumulated image data from a previous frame to a current frame;

a sensing circuit configured to provide sensing data by sensing the degree of deterioration in pixels in the at least one first region of the display panel and not sensing the degree of deterioration in pixels in the at least one second region of the display panel; and a compensation circuit configured to calculate an amount of compensation of each of the pixels in the first region using the sensing data, generate compensation data for compensating for the deterioration in the pixels in the first region and the second region, based on the amount of compensation, and correct an input image signal using the compensation data, wherein the compensation circuit compensates for the deterioration in the pixels in the first region and the second region using at least one of a minimum value, average value, and maximum value of the amount of compensation based on a difference between the minimum value and the maximum value, and wherein each of the at least one first region and the at least one second region includes at least one entire column of pixels disposed along a vertical direction in the display panel.

15. The source driver of claim 14, wherein when the difference is less than a reference value, the compensation circuit compensates for the deterioration in the pixels in the first region and the second region using at least one of the minimum value, average value, and maximum value of the amount of compensation.

16. The source driver of claim 14, wherein when the difference is equal to or more than the reference value, the compensation circuit compensates for the deterioration in the pixels in the first region based on an amount of compensation in which gradient weight has been applied to surrounding pixels based on a pixel having the maximum value of the amount of compensation.

* * * * *